United States Patent
Lee et al.

(10) Patent No.: US 8,175,274 B2
(45) Date of Patent: May 8, 2012

(54) RANGE MEASUREMENT APPARATUS AND METHOD USING CHAOTIC UWB WIRELESS COMMUNICATION

(75) Inventors: Cheol-Hyo Lee, Daejon (KR); Jae-Young Kim, Bucheon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1078 days.

(21) Appl. No.: 12/065,124

(22) PCT Filed: May 25, 2006

(86) PCT No.: PCT/KR2006/001973
§ 371 (c)(1),
(2), (4) Date: Feb. 28, 2008

(87) PCT Pub. No.: WO2007/066859
PCT Pub. Date: Jun. 14, 2007

(65) Prior Publication Data
US 2008/0226072 A1   Sep. 18, 2008

(30) Foreign Application Priority Data

Dec. 8, 2005   (KR) .................... 10-2005-0119592
May 18, 2006  (KR) .................... 10-2006-0044690

(51) Int. Cl.
*H04L 29/06* (2006.01)
(52) U.S. Cl. ..................................... 380/263
(58) Field of Classification Search .................... 380/263
See application file for complete search history.

(56) References Cited

U.S. PATENT DOCUMENTS

| | | | | |
|---|---|---|---|---|
| 5,291,555 A | * | 3/1994 | Cuomo et al. | 380/263 |
| 5,432,697 A | * | 7/1995 | Hayes | 700/38 |
| 5,506,795 A | * | 4/1996 | Yamakawa | 708/250 |
| 5,841,946 A | * | 11/1998 | Naito et al. | 706/62 |
| 5,883,591 A | * | 3/1999 | McEwan | 342/22 |

(Continued)

FOREIGN PATENT DOCUMENTS

JP   2003-194923   7/2003

(Continued)

OTHER PUBLICATIONS

Cheolhyo Lee, Implementation of Chaotic UWB Systems for Low Rate WPAN, 2005, Electronics and Telecommunication Research Institute (ETRI).*

(Continued)

*Primary Examiner* — David Garcia Cervetti
(74) *Attorney, Agent, or Firm* — Lowe Hauptman Ham & Berner LLP

(57) ABSTRACT

An apparatus for measuring a range based on a chaotic ultra wideband (UWB) wireless communication technology is disclosed. The Apparatus includes a chaotic signal generating/modulating unit, a transceiving unit, a detecting unit, a transform unit, a comparison unit, and a range measurement unit. The transform unit converts the analog voltage signal from the detecting unit into digital signals based on a first sampling period. The comparison unit compares the analog voltage signal from the detecting unit with a predetermined threshold value and to output a comparison signal. The range measurement unit is configured to calculate a time point corresponding to a leading edge, which is a moment when initial data of a packet payload arrive, by using the digital signals based on the threshold value and by using the comparison signal, and to perform a range measurement calculation based on the time point corresponding to the leading edge.

8 Claims, 7 Drawing Sheets

U.S. PATENT DOCUMENTS

| | | | |
|---|---|---|---|
| 6,064,701 A | 5/2000 | Tresser et al. | |
| 6,212,239 B1* | 4/2001 | Hayes | 375/259 |
| 6,239,416 B1* | 5/2001 | Nomura et al. | 219/702 |
| 6,404,364 B1* | 6/2002 | Fetterman et al. | 341/131 |
| 6,417,497 B2* | 7/2002 | Nomura et al. | 219/494 |
| 6,639,541 B1* | 10/2003 | Quintana et al. | 342/18 |
| 6,678,312 B1* | 1/2004 | Mohindra | 375/150 |
| 6,721,289 B1* | 4/2004 | O'Toole et al. | 370/311 |
| 6,738,313 B2* | 5/2004 | Fortuna et al. | 367/100 |
| 6,961,541 B2* | 11/2005 | Overy et al. | 455/41.2 |
| 6,980,656 B1* | 12/2005 | Hinton et al. | 380/263 |
| 6,999,445 B1* | 2/2006 | Dmitriev et al. | 370/342 |
| 7,245,723 B2* | 7/2007 | Hinton et al. | 380/263 |
| 7,415,683 B2* | 8/2008 | Ditto et al. | 716/132 |
| 7,647,366 B2* | 1/2010 | Meintrup et al. | 708/250 |
| 7,738,576 B2* | 6/2010 | Kim et al. | 375/260 |
| 7,786,815 B2* | 8/2010 | Lee et al. | 331/78 |
| 7,795,983 B1* | 9/2010 | Delaney et al. | 331/78 |
| 7,830,214 B2* | 11/2010 | Han et al. | 331/78 |
| 7,839,939 B2* | 11/2010 | Lee et al. | 375/259 |
| 7,945,045 B2* | 5/2011 | Kim et al. | 380/46 |
| 7,974,413 B2* | 7/2011 | Chester et al. | 380/263 |
| 2002/0124032 A1* | 9/2002 | Karp | 708/250 |
| 2002/0154677 A1* | 10/2002 | Occhipinti et al. | 375/130 |
| 2003/0133362 A1* | 7/2003 | Fortuna et al. | 367/100 |
| 2004/0192234 A1* | 9/2004 | Glenn et al. | 455/127.1 |
| 2004/0201457 A1* | 10/2004 | O'Toole et al. | 340/10.33 |
| 2005/0129413 A1* | 6/2005 | Lee et al. | 398/189 |
| 2006/0072754 A1* | 4/2006 | Hinton et al. | 380/263 |
| 2006/0091905 A1* | 5/2006 | Ditto et al. | 326/41 |
| 2006/0104448 A1* | 5/2006 | Kim et al. | 380/263 |
| 2006/0136016 A1* | 6/2006 | Kim et al. | 607/60 |
| 2007/0124593 A1* | 5/2007 | Kim et al. | 713/171 |
| 2007/0133694 A1* | 6/2007 | Kim et al. | 375/259 |
| 2007/0133801 A1* | 6/2007 | Kim et al. | 380/263 |
| 2007/0139054 A1* | 6/2007 | Tufillaro et al. | 324/527 |
| 2008/0008320 A1* | 1/2008 | Hinton et al. | 380/263 |
| 2010/0254430 A1* | 10/2010 | Lee et al. | 375/130 |

FOREIGN PATENT DOCUMENTS

| | | |
|---|---|---|
| JP | 2004-301588 | 10/2004 |
| JP | 2005-051466 | 2/2005 |
| KR | 1020000013680 | 3/2000 |
| KR | 1020030024808 | 3/2003 |
| KR | 1020060068466 | 6/2006 |
| KR | 100665374 | 12/2006 |

OTHER PUBLICATIONS

A.S.Dmitriev Ultrawideband Direct Chaotic Data Transmission in the Microwave Range, 2003, MAIK, Institute of Radio Engineering and Electronics, Russian Academy of Sciences, Moscow, Russia.*

A.S.Dmitriev, Ultrawideband Direct Chaotic Data Transmission in the Microwave Range, 2003, MAIK, Institute of Radio Engineering and Electronics, Russian Academy of Sciences, Moscow, Russia.*

Dmitriev, A.S. et al.: "Ring oscillating systems and their application to the synthesis of chaos generators"; International journal of bifurcation and chaos in applied sciences and engineering; vol. 6 (5); May 1996; pp. 851-865.

Dmitriev A.S. et al.; "Ultra Wideband Direct Chaotic Communications for Low Bitrate Information Transmission"; Technical Physics Letters, vol. 29; Jan. 2003; pp. 72-74.

Cheolhyo Lee et al.; "Implementation of Chaotic UWB Systems for Low Rate WPAN"; ICCCS 2005; Nov. 25, 2005; pp. 339-342.

International Search Report mailed on Oct. 17, 2006 for PCT/KR2006/001973.

Notice of Allowance for Korean Application 10-2006-0044690.

* cited by examiner

RANGE MEASUREMENT APPARATUS AND METHOD USING CHAOTIC UWB WIRELESS COMMUNICATION

CROSS REFERENCE TO RELATED APPLICATION

This application claims the priority of Korean Patent Application No. 10-2005-0119592, filed on Dec. 8, 2005 and the priority of Korean Patent Application No. 10-2006-0044690, filed on May 18, 2006 in the Korean Intellectual Property Office, the disclosure of which are incorporated herein in their entirety by reference. Further, this application is the National Phase application of International Application No. PCT/KR2006/001973, filed May 25, 2006, which designates the United States and was published in English. This application, in its entirety, is incorporated herein by reference.

TECHNICAL FIELD

The present invention relates to a chaotic Ultra Wide Band (UWB) wireless communication technology; and, more particularly, to a range measurement apparatus and method based on chaotic UWB wireless communication technology.

BACKGROUND ART

Among Ultra Wide Band (UWB) wireless communication technologies which have made a remarkable advancement for the last few years, a chaotic UWB wireless communication technology performs a communication by using UWB signals based on a Chaos Theory, which will be referred to as chaotic signals, hereinafter. Conventional narrow-band wireless communication technology requires an intermediate frequency (IF) up-converter and an IF down-converter to convert the frequency of baseband signals and transmit/receive digital data over an ultra high frequency of several GHz. However, with the chaotic UWB wireless communication technology, it is possible to form a UWB signal spectrum without the IF up-converter and IF down-converter to thereby realize a communication system having a simple functional structure.

A chaotic signal generator generating the UWB signal spectrum can be realized in the form of a chaotic oscillator. Researchers have been studying chaotic oscillators theoretically since 1980s. In 1993, the chaotic oscillators have become widely known as a Chua's circuit is introduced. However, the transformation possibility of a circuit or a device has been obscure in the Chua's circuit.

A first related art disclosed in an article by A. S. Dmitrev et al., entitled "Ring oscillating systems and their application to the synthesis of chaos generators," *International Journal of bifurcation and chaos in applied science and engineering*, vol. 6, pp. 851-865, May 1996, analytically provides an UWB signal generation process complementing shortcomings of the Chua's circuit. According to the first related art, signals generated in a non-linear device pass through primary and secondary low pass filters (LPFs) and then fed back into the non-linear device. The feedback signals oscillate in a wide frequency band. According to the first related art basically, wideband signals are generated based on a filter coefficient in an oscillation frequency of each filter. The wideband signals are UWB signals having a center frequency of several GHz and a bandwidth of over hundreds of MHz.

A second related art by A. S. Dmitrev et al., entitled "Ultra wideband direct chaotic communication for low bit rate information transmission," *Technical Physics Letters*, Vol. 29, pp. 22-74, January 2003, realizes a chaotic UWB wireless communication system based on the first related art. The chaotic UWB wireless communication system of the second related art includes a chaotic oscillator, a detector, an analog-to-digital converter, and a baseband processor, and it operates in a bandwidth from 2 GHz to 4 GHz.

However, the chaotic UWB wireless communication system can hardly control the frequency band of the chaotic signals, and it shows a low detection performance because it adopts a conventional on/off keying method.

A conventional communication protocol for measuring a range between devices is already defined. FIG. 1 describes the conventional communication protocol for measuring a range between devices. According to the conventional communication protocol, a range is measured by transmitting a packet from a node 1 to a node 2 and calculating a round trip time of the packet returning from the node 2 back to the node 1. In short, a round trip time T of a packet is calculated by measuring a time T_prop1 which is taken for the packet to be transmitted from the node 1 to the node 2, a time T_process which is taken for the packet to be processed in the node 2, and a time T_prop2 which is taken for the packet to be transmitted from the node 2 to the node 1. Herein, $T = T\_prop1 + T\_process + T\_prop2$. The moment when the packet arrives at the node 2, the moment when the packet process is completed at the node 2, and the time when the packet arrives at the node 1 are based on a leading edge, which is a moment when the first data of a packet payload arrive following a packet header. A range R is measured based on the following Equation 1 and the acquired total round trip time T of the packet.

$$R = C*(T - T\_process)/2 \qquad \text{Eq. 1}$$

where C denotes a propagation speed.

An exact leading edge should be acquired to measure the range precisely based on the Equation 1.

However, no communication system having a range measurement function has been suggested in connection with the conventional chaotic UWB wireless communication technology.

DISCLOSURE

Technical Problem

It is, therefore, an object of the present invention to provide a range measurement apparatus and method that can easily control a chaotic signal bandwidth by improving a chaotic oscillator of a conventional chaotic UWB wireless communication system, increase a chaotic signal detection performance by improving a typical on/off keying method, and perform communication and measure a range by employing a range measurement function, which is not provided in conventional technologies.

Other objects and advantages of the present invention will be understood by the following description and become apparent with reference to embodiments of the present invention. Also, it is obvious to those skilled in the art of the present invention that the objects and advantages of the present invention can be realized by the means as claimed and combinations thereof.

Technical Solution

In accordance with one aspect of the present invention, there is provided an apparatus for measuring a range based on a chaotic ultra wideband (UWB) wireless communication technology, the apparatus which includes: a chaotic signal generating/modulating unit for generating and modulating chaotic signals and outputting the modulated chaotic signals to a transceiving unit; a transceiving unit for transmitting/receiving radio signals; a detecting unit for detecting the radio signals inputted from the transceiving unit in the form of voltage signals; a transform unit for sampling the analog voltage signals inputted from the detecting unit and outputting first digital signals of a predetermined level; a comparison unit for comparing levels of the analog voltage signals inputted from the detecting unit with a predetermined threshold value and outputting binary digital signals, which are second digital signals; and a range measurement unit for calculating a leading edge, which is a moment when initial data of a packet payload arrive, by using the binary signals obtained in the transform unit from the transformation of the first digital signals based on the threshold value and by using the second digital signals outputted from the comparison unit, and performing a range measurement calculation based on the leading edge.

In accordance with another aspect of the present invention, there is provided a method for measuring a range based on a chaotic UWB wireless communication technology, the method which includes the steps of: a) acquiring a leading edge, which is a moment when initial data of a packet payload arrive, by using binary signals obtained in a transform unit from transformation of first digital signals based on a predetermined threshold value and by using second digital signals outputted from a comparison unit; and b) performing a range measurement calculation based on the leading edge.

Advantageous Effects

A range measurement apparatus and method of the present invention can easily control a chaotic signal bandwidth by improving a chaotic oscillator of a conventional chaotic UWB wireless communication system, increase a chaotic signal detection performance by improving a typical on/off keying method, and perform communication and measure a range by employing a range measurement function, which is not provided in conventional technologies.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter. Accordingly, those skilled in the art of the present invention can easily implement the technological concept of this invention. When it is considered that detailed description on a related art may obscure a point of the present invention, it will not be provided herein. Hereinafter, embodiments of the present invention will be described in detail with reference to the drawings.

Figure 1:
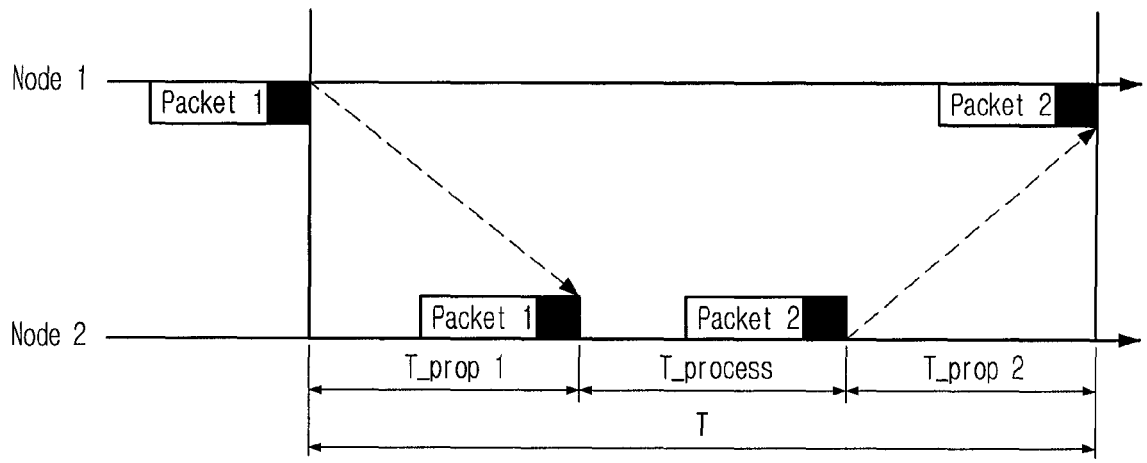
FIG. 1 is a view illustrating a conventional communication protocol for measuring a range between devices.
Figure 2:
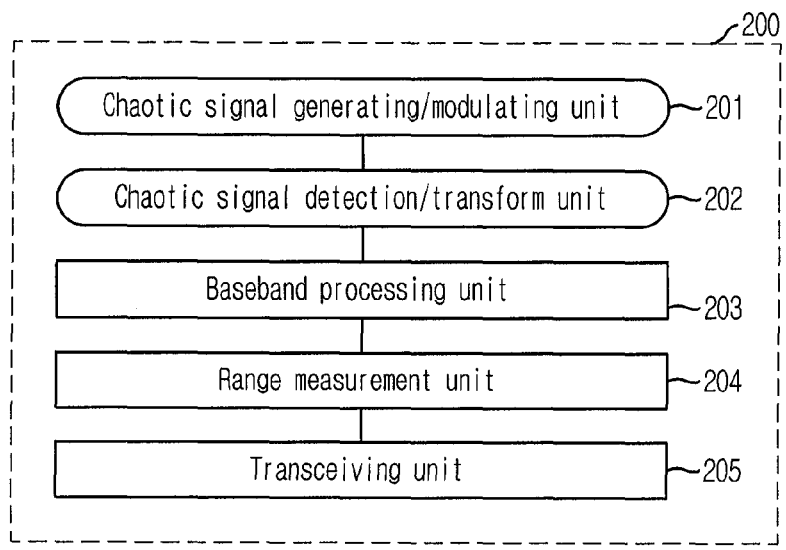
FIG. 2 is a block diagram showing a range measurement apparatus employing a chaotic UWB wireless communication technology in accordance with an embodiment of the present invention.

FIG. 2 is a block diagram showing a range measurement apparatus employing a chaotic UWB wireless communication technology in accordance with an embodiment of the present invention.

As shown in the drawing, the range measurement apparatus 200 measures a range as soon as it transmits/receives digital data by transmitting/receiving chaotic signals in the form of packets. The range measurement apparatus 200 includes a chaotic signal generating/modulating unit 201, a chaotic signal detection/transform unit 202, a baseband processing unit 203, a range measurement unit 204, and a transceiving unit 205.

The chaotic signal generating/modulating unit 201 generates and modulates chaotic UWB signals and transmits the modulated signals to the transceiving unit 205. The chaotic signal detection/transform unit 202 detects and transforms the inputted radio signals into digital signals. The range measurement unit 204 measures a range based on the digital signals inputted from the detection/transform unit 202. The transceiving unit 205 transmits/receives the radio signals through a radio network. The range measurement apparatus 200 will be described hereinafter with reference to FIG. 3.

Figure 3:
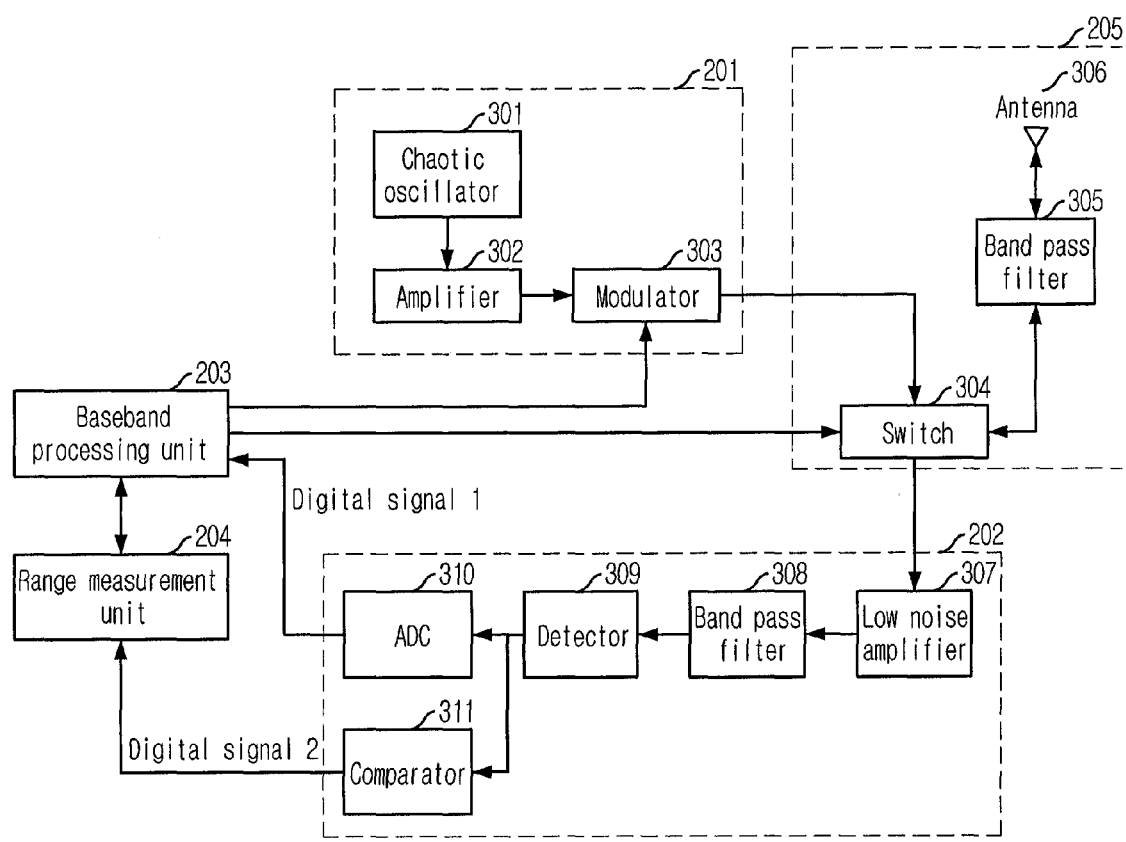
FIG. 3 is a detailed block diagram illustrating a range measurement apparatus of FIG. 2.

FIG. 3 is a detailed block diagram illustrating the range measurement apparatus 200 of FIG. 2.

As shown in FIG. 3, the chaotic signal generating/modulating unit 201 includes a chaotic oscillator 301, an amplifier 302, and a modulator 303. The chaotic oscillator 301 generates chaotic signals.

According to an example of the present invention, the chaotic oscillator 301 is realized to have a differential amplifier and a band pass filter to thereby generate chaotic UWB signals having a center frequency of 4 GHz and a bandwidth of 3 GHz to 5 GHz.

Figure 4:
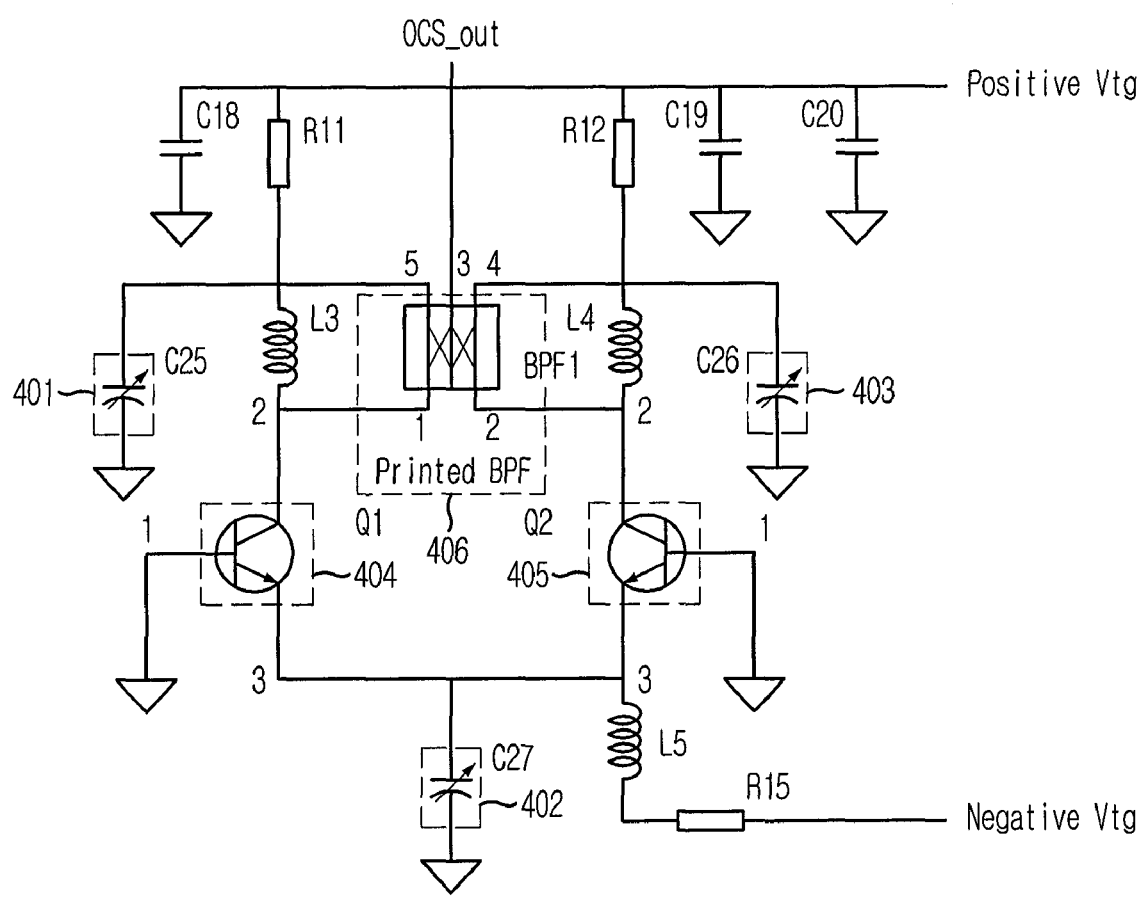
FIG. 4 is a circuit diagram describing a chaotic oscillator in accordance with an embodiment of the present invention.

FIG. 4 is a circuit diagram describing a chaotic oscillator in accordance with an embodiment of the present invention. As shown in FIG. 4, the chaotic oscillator includes two differential amplifiers 404 and 405, which are used as non-linear devices, a pass filter 406, and variable condensers 401, 402 and 403 for tuning frequency. The two differential amplifiers 404 and 405 receive a positive voltage and a negative voltage and amplify signals. The amplified signals outputted from the differential amplifiers 404 and 405 go through filtering in the band pass filter 406 and those that have passed through the band pass filter 406 are outputted into an OSC_out node. The output signals of the OSC_out node are fed back to the differential amplifiers 404 and 405. When only one amplifier is used as the non-linear device in a conventional chaotic oscillator and chaotic UWB signals are generated, a voltage level is hardly maintained uniformly over the entire band. Also, since there is a period in which power is not generated in the middle of the band, the chaotic oscillator cannot generate signals in a desired band. In the embodiment of the present invention, the chaotic oscillator employs two differential amplifiers 404 and 405. Thus, although any one of the amplifiers does not generate signals momentarily at a particular time, the other amplifier still generates signals to thereby maintain a predetermined voltage level over the entire band. Therefore, the chaotic oscillator can stably generate signals in a desired band.

Figure 5:
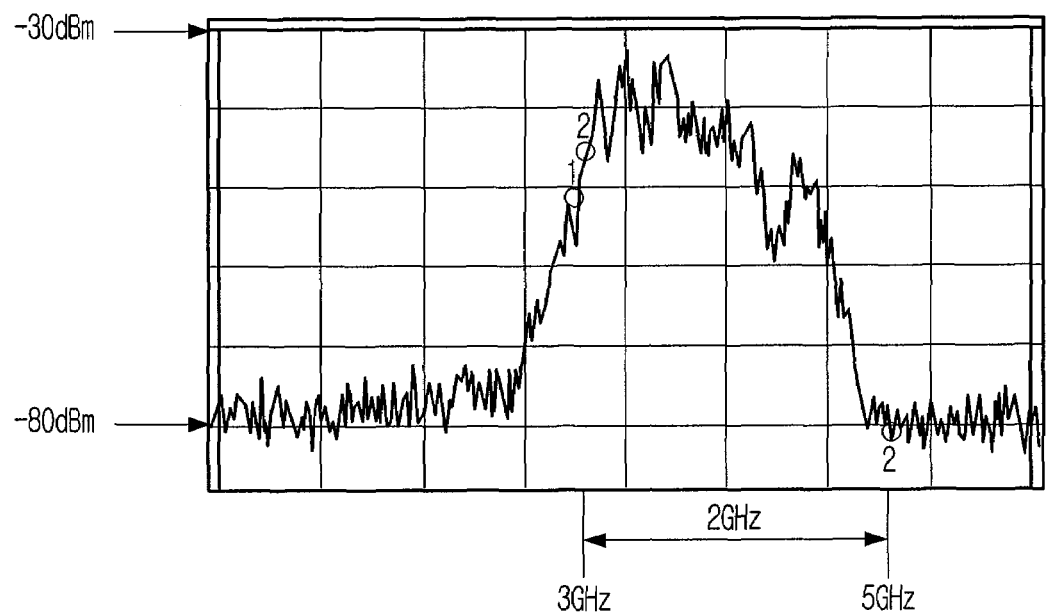
FIG. 5 is a view showing a spectrum waveform of chaotic signals generated in the chaotic oscillator of FIG. 4.

FIG. 5 shows a spectrum waveform of chaotic signals generated in the chaotic oscillator of FIG. 4. As illustrated in FIG. 5, the power level difference was 50 dB between the maximum −30 dBm to minimum −80 dBm, and the bandwidth is 2 GHz. The bandwidth determined by the chaotic oscillator suits for the Federal Communications Commission (FCC) Specification.

Back to FIG. 3, the amplifier 302 amplifies the power of the chaotic signals outputted from the chaotic oscillator 301. The modulator 303 modulates the amplified chaotic signals obtained in the amplifier 302 based on a data sequence generated in the baseband processing unit 203. A shortcoming of the conventional on/off keying modulation method is that it is difficult to detect a starting point of a bit when 0 data are received consecutively because there is no signal level in an off period. To solve this problem, the baseband processing unit 203 generates a predetermined data sequence with an additional bit added to data 1 or 0, and modulates the chaotic signals based on the data sequence generated in the baseband processing unit 203 to thereby increase the detection performance. The present specification provides an example where the chaotic signals are modulated by generating a data sequence after coding data 1 as 1010 and data 0 as 1000. The modulated chaotic signals obtained in the modulator 303 are wirelessly transmitted through the transceiving unit 205.

The detection/transform unit 202 includes a low noise amplifier 307, a band pass filter 308, a detector 309, an analog-to-digital converter (ADC) 310, and a comparator 311. The low noise amplifier 307 amplifies radio signals transmitted from the transceiving unit 205 without adding noise components. The band pass filter 308 limits the band of the amplified signals outputted form the low noise amplifier 307 to a predetermined band. As an example, the band of the amplified signals is limited to a band ranging from 3 GHz to 5 GHz.

Figure 6:
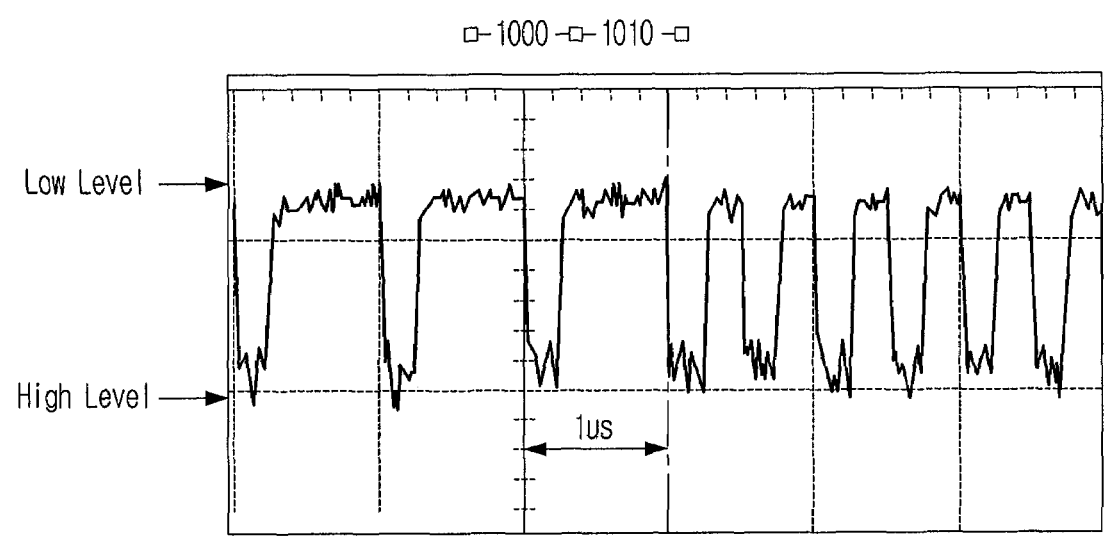
FIG. 6 is a view showing a waveform of analog voltage signals outputted from a detector in accordance with an embodiment of the present invention.

The detector 309 detects a voltage signal outputted from the band pass filter 308 as a voltage signal. FIG. 6 shows a waveform of analog voltage signals outputted from the detector 309. As shown in FIG. 6, the detected analog voltage signal has a high level and a low level. The above-described baseband processing unit 203 according to an embodiment of the present invention generates a predetermined data sequence where an additional bit is added to originally generated data 1 or 0. The modulator 303 can increase the detection performance in receiving mode by modulating the chaotic signals based on the data sequence generated in the baseband processing unit 203. In short, when the chaotic signals outputted from the modulator 303 return from a user terminal, the detector 309 converts the power level of the return signals into an analog voltage level and then a digital signal 1 outputted from the ADC is used to recover the original '1' and '0' data by removing redundant bits in the baseband processing unit 203.

Back to FIG. 3, the ADC 310 performs sampling on analog voltage signals outputted from the detector 309 and outputs a predetermined level of a digital signal, which will be referred to as a digital signal 1, hereinafter. The digital signal 1 outputted from the ADC 310 is converted into a binary signal, which is formed of '0' and '1,' in processing unit 203 and inputted to the range measurement unit 204 to be used for range measurement.

Meanwhile, when a range is to be measured by using only the digital signal 1 outputted from the ADC 310, it is difficult to exactly measure the range due to a difference in sampling periods and limitation in the performance of a high-speed ADC for minimizing the difference among sampling periods. Therefore, both ADC 310 and comparator 311 are used for the range measurement in the present invention. The comparator 311 compares analog voltage signals outputted from the detector 309 with the predetermined threshold value to thereby output an on/off digital signal, which will be referred to as a digital signal 2, hereinafter. For example, when the outputted digital signal 2 is "1" which signifies 'on,' when the voltage signal outputted from the detector 309 is higher than the threshold value. When it is lower than the threshold value, the outputted digital signal 2 is "0" which signifies 'off.'

Figure 8:
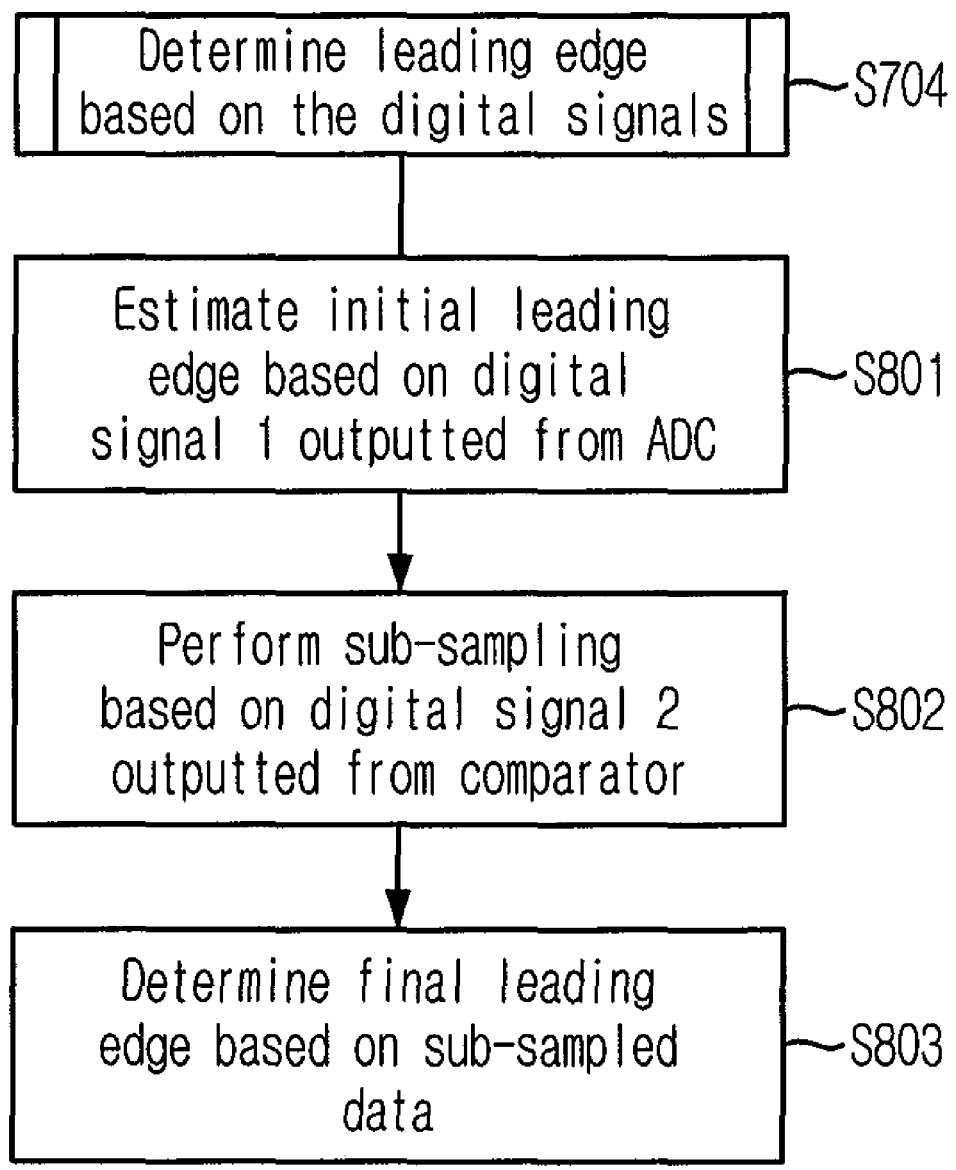
FIG. 8 is a flowchart describing a leading edge determination process of FIG. 7.
Figure 9:
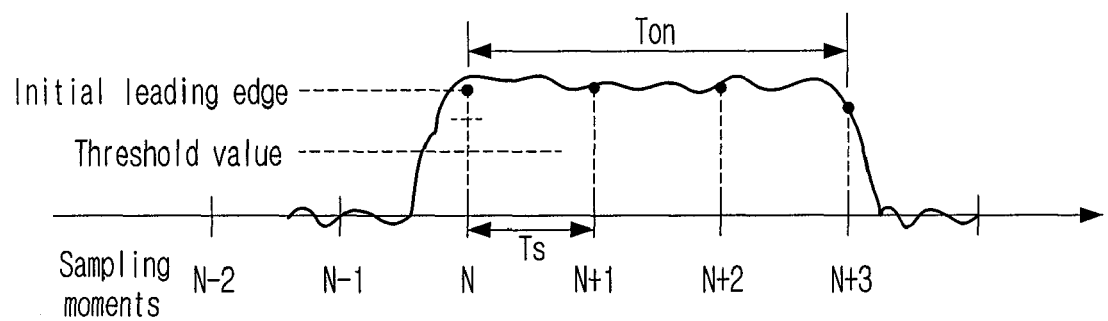
FIG. 9 is a view showing a waveform of analog voltage signals outputted from a detector.
Figure 10:
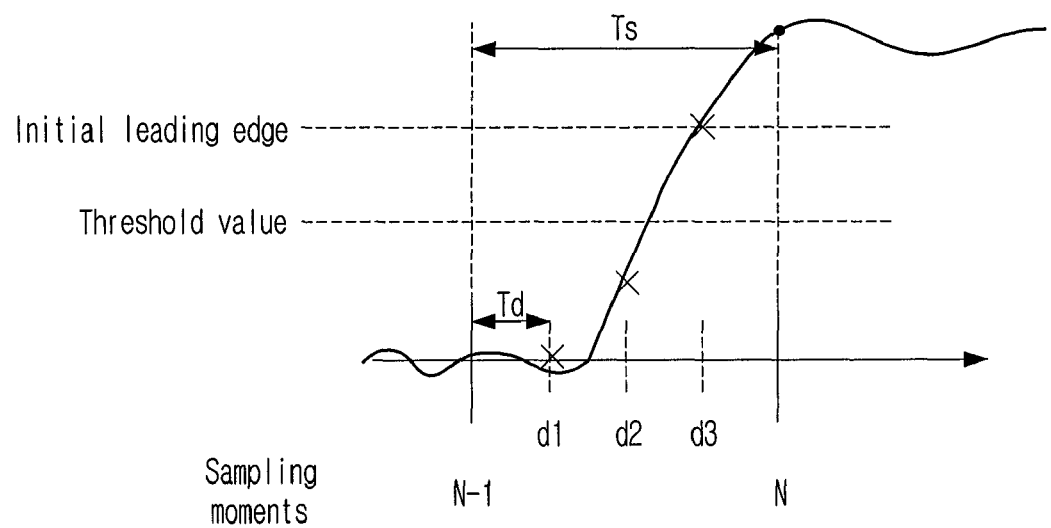
FIG. 10 is a view showing a waveform between a sampling moment N−1 and an N sampling moment among signal waveforms of FIG. 9.

The range measurement unit 204 performs a range measurement calculation based on the digital signal 1 outputted from the ADC 310 and the digital signal 2 outputted from the comparator 311. To be specific, a round trip time of a packet should be accurately measured for the range determination, and a moment when the packet arrives should be accurately measured for measurement of the packet round trip time. The moment when the packet arrives is based on a leading edge, which is a moment when initial data of a packet payload arrive. To find out the exact leading edge, an initial leading edge is decided based on the digital signal 1 outputted from the ADC 310 and then a final leading edge is decided by performing sub-sampling based on the initial leading edge and the digital signal 2 outputted from the comparator 311, which is shown in FIGS. 8, 9 and 10.

The transceiving unit 205 includes a switch 304, a band pass filter 305, and an antenna 306. The switch 304 selects a transmission/reception path according to a transmission/reception mode. The band pass filter 305 limits the band of the signals outputted from the chaotic signal generating/modulating unit 201 and the switch 304 in a transmission mode and the band of the signals transmitted from the antenna 306 and inputted to the low noise amplifier 307 of a chaotic signal detection/transform unit 202 in a reception mode into a desired band. As an example, the band of the band pass filter 305 is limited to a band ranging 3 GHz to 5 GHz in the present specification.

Figure 7:
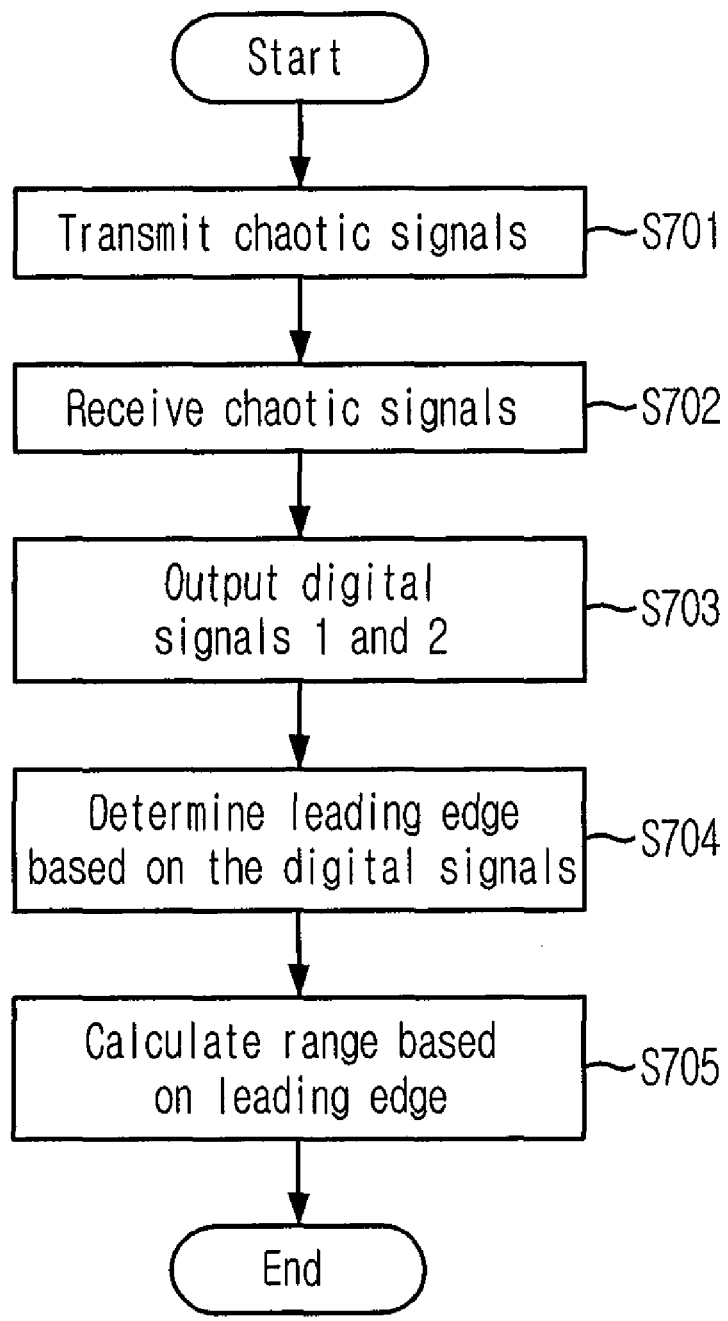
FIG. 7 is a flowchart describing a range measurement method based on a chaotic UWB wireless communication technology in accordance with an embodiment of the present invention.

FIG. 7 is a flowchart describing a range measurement method based on a chaotic UWB wireless communication technology in accordance with an embodiment of the present invention.

In step S701, the chaotic signal generating/modulating unit 201 and the transceiving unit 205 of the range measurement apparatus 200 transmits chaotic signals wirelessly.

In step S702, the chaotic signals return to the range measurement apparatus 200 after processed in a user terminal for a predetermined time.

The chaotic signals received in the range measurement apparatus 200 are converted into voltage signals through the transceiving unit 205, the low noise amplifier 307, a band pass filter 308, and the detector 309. The voltage signals outputted from the detector 309 are inputted to the ADC 310 and the comparator 311 to be outputted as the digital signals 1 and 2 in step S703. In short, the voltage signals outputted from the detector 309 are outputted as the digital signal 1 from the ADC 310, and converted into binary signals of '0' and '1' in the baseband processing unit 203. Meanwhile, the voltage signals outputted form the detector 309 are outputted as the digital signal 2 from the comparator 311 based on a predetermined threshold value and then inputted to the range measurement unit 204.

Subsequently, in step S704, the range measurement unit 204 determines an exact leading edge based on the binary signal obtained from the digital signal 1 and the digital signal 2, which is shown in FIGS. 8, 9 and 10.

In step S705, the range measurement unit 204 measures a round trip time of a packet based on the leading edge and performs a range measurement calculation based on the Equation 1.

FIG. 8 is a flowchart describing a leading edge determination process of FIG. 7. In step S801, an initial leading edge is estimated based on the binary signal which is obtained in the baseband processing unit 203 from the digital signal 1 outputted from the ADC 310. The initial leading edge estimation in the step S801 will be described with reference to FIG. 9. FIG. 9 shows a waveform of analog voltage signals outputted from the detector. As shown in the drawing, data sampled at sampling moments N−2, N−1, . . . , N+3 by a sampling period $T_s$, are digital signals 1 outputted from the ADC 310. The digital signals 1 is compared with a predetermined threshold value to be outputted as binary signals. Since the sampled data at the sampling moments N to N+3 are larger than the threshold value, they are outputted as '1' from the baseband processing unit 203. However, the sampled data at the sampling moments N−1 and N−2 are outputted as '0' from the baseband processing unit 203. The binary signals are inputted to the range measurement unit 204. The range measurement unit 204 estimates the initial leading edge by selecting a point (N) of sampled data initially having a '1' signal as a leading edge.

Back to FIG. 8, sub-sampling is carried out in step S802 between the sampled data at the N point and the sampled data at the N−1 point based on the digital signal 2 outputted from the comparator 311. In step S803, a final leading edge is determined based on the sub-sampled data outputted from the sub-sampling step S802. The sub-sampling in the step S802 and the final leading edge determination in the step S803 will be described with reference to FIG. 10.

FIG. 10 shows a waveform between a sampling moment N−1 and a sampling moment N among signal waveforms of FIG. 9. As shown in the drawing, sub-sampling is performed in a predetermined period between the sampled data in the N period and the sampled data in the N−1 period, and a sub-sampling moment where the sub-sampled data become initially larger than the threshold value among the sub-sampled data is determined as the final leading edge. For example, signals at the sampling moment d1, d2 and d3 are sub-sampled by a sampling period Td in the present specification. When a range measurement function is required, the above sub-sampling increases the accuracy of a range measurement in a low-speed data communication such as Wireless Personal Area Networks (WPAN) and decreases power consumption.

According to an example of the sub-sampling, time delay Td, 2Td and 3Td are generated by connecting digital clocks inputted to the ADC 310 to a delay line such that a sampling period $T_s$ for initial leading edge detection can acquire an effect of obtaining $T_s/T_d$-fold sampled data ($T_s<T_d$). Signals at the sub-sampling moment d1, d2 and d3 can be acquired by performing logical AND operation on the output signals of the comparator 311. As a result of the sub-sampling, since the sampled data have a '1' signal at the sub-sampling moment d3, the sub-sampling moment d3 is determined as the final leading edge.

The range measurement unit 204 can measure a range between devices by exactly determining the final leading edge through the steps S801 to S803 and measuring the packet round trip time (T).

INDUSTRIAL APPLICABILITY

The technology of the present invention is applied to chaotic UWB wireless communication technology.

What is claimed is:

1. An apparatus for measuring a range based on a chaotic ultra wideband (UWB) wireless communication technology, comprising:
   a chaotic signal generating/modulating unit configured to generate and modulate a chaotic signal and to output the modulated chaotic signal to a transceiving unit;
   the transceiving unit configured to transmit the modulated chaotic signal or to receive a radio signal;
   a detecting unit configured to output an analog voltage signal according to the received radio signal;
   a transform unit configured to convert the analog voltage signal from the detecting unit into digital signals based on a first sampling period;
   a comparison unit configured to compare the analog voltage signal from the detecting unit with a predetermined threshold value and to output a comparison signal; and
   a range measurement unit configured to calculate a time point corresponding to a leading edge, which is a moment when initial data of a packet payload arrive, by using the digital signals based on the threshold value and by using the comparison signal, and to perform a range measurement calculation based on the time point corresponding to the leading edge.

2. The apparatus as recited in claim 1, wherein the chaotic signal generating/modulating unit is configured to modulate the chaotic signal based on a data sequence, the data sequence is generated by replacing data "1" or data "0" in a raw data sequence with predetermined data coding sequences, each of the predetermined data coding sequences has two or more bits.

3. The apparatus as recited in claim 2, wherein the data coding sequence is '1010' with respect to data '1,' and '1000' with respect to data '0.'

4. An apparatus for measuring a range based on a chaotic ultra wideband (UWB) wireless communication technology, comprising:
   a chaotic signal generating/modulating unit configured to generate and modulate a chaotic signal and to output the modulated chaotic signal to a transceiving unit;
   the transceiving unit configured to transmit the modulated chaotic signal or to receive a radio signal;
   a detecting unit configured to output an analog voltage signal according to the received radio signal;
   a transform unit configured to convert the analog voltage signal from the detecting unit into digital data based on a first sampling period;
   a comparison unit configured to compare the analog voltage signal from the detecting unit with a predetermined threshold value and to output a comparison signal; and
   a range measurement unit configured to calculate a time point corresponding to a leading edge, which is a moment when initial data of a packet payload arrive, by using the digital data based on the threshold value and by using the comparison signal, and to perform a range measurement calculation based on the time point corresponding to the leading edge, wherein the chaotic signal generating/modulating unit comprises:
a differential pair configured to receive and amplify a pair of differential voltage signals, the differential pair including a first amplifier and a second amplifier; and
a chaotic oscillator which includes a band pass filter configured to filter output signals of the first and second amplifiers.

5. The apparatus as recited in claim 4, wherein the chaotic signal generated by the chaotic oscillator has a center frequency of 4 GHz and a bandwidth ranging from 3 GHz to 5 GHz.

6. An apparatus for measuring a range based on a chaotic ultra wideband (UWB) wireless communication technology, comprising:
a chaotic signal generating/modulating unit configured to generate and modulate a chaotic signal and to output the modulated chaotic signal to a transceiving unit;
the transceiving unit configured to transmit the modulated chaotic signal or to receive a radio signal;
a detecting unit configured to output an analog voltage signal according to the received radio signal;
a transform unit configured to convert the analog voltage signal from the detecting unit into digital data based on a first sampling period;
a comparison unit configured to compare the analog voltage signal from the detecting unit with a predetermined threshold value and to output a comparison signal; and
a range measurement unit configured to calculate a time point corresponding to a leading edge, which is a moment when initial data of a packet payload arrive, by using the digital signals based on the threshold value and by using the comparison signal, and to perform a range measurement calculation based on the time point corresponding to the leading edge,
wherein the range measurement unit is configured to:
estimate a sampling moment of a datum of the digital data having value '1' immediately after a datum of the digital data having value '0' as an initial time point corresponding to the leading edge;
generate sub-sampled data by performing a sub-sampling according to a second sampling period shorter than the first sampling period on the comparison signal between the sampled moment of the datum having value '1' and a sampled moment of the datum having value '0'; and
determine a final time point corresponding to the leading edge as the time point corresponding to the leading edge based on the sub-sampled data.

7. A method of measuring a range based on a chaotic ultra wideband (UWB) wireless communication technology in a range measurement apparatus, comprising:
acquiring a time point corresponding to a leading edge, which is a moment when initial data of a packet payload arrive, by using digital data obtained by a transform unit from transformation of an analog voltage signal and by using a comparison signal outputted from a comparison unit based on comparing the analog voltage signal with a predetermined threshold value; and
performing a range measurement calculation based on the time point corresponding to the leading edge,
wherein the range measurement apparatus includes:
a chaotic signal generating/modulating unit configured for generating and modulating a chaotic signal and outputting the modulated chaotic signal to a transceiving unit;
the transceiving unit configured for transmitting the modulated chaotic signal or receiving a radio signal;
a detecting unit for outputting the analog voltage signal according to the received radio signal;
the transform unit configured for converting the analog voltage signal from the detecting unit into digital data based on a first sampling period;
the comparison unit configured for comparing the analog voltage signal with the predetermined threshold value to output the comparison signal; and
a range measurement unit configured for calculating the time point corresponding to the leading edge by using the digital data based on the threshold value and by using the comparison signal, and for performing the range measurement calculation.

8. A method of measuring a range based on a chaotic ultra wideband (UWB) wireless communication technology in a range measurement apparatus, comprising:
acquiring a time point corresponding to a leading edge, which is a moment when initial data of a packet payload arrive, by using digital data obtained by a transform unit from transformation of an analog voltage signal and by using a comparison signal outputted from a comparison unit based on comparing the analog voltage signal with a predetermined threshold value; and
performing a range measurement calculation based on the time point corresponding to the leading edge,
wherein the range measurement apparatus includes:
a chaotic signal generating/modulating unit configured for generating and modulating a chaotic signal and outputting the modulated chaotic signal to a transceiving unit;
the transceiving unit configured for transmitting the modulated chaotic signal or receiving a radio signal;
a detecting unit for outputting the analog voltage signal according to the received radio signal;
the transform unit configured for converting the analog voltage signal from the detecting unit into digital data based on a first sampling period;
the comparison unit configured for comparing the analog voltage signal with the predetermined threshold value to output the comparison signal; and
a range measurement unit configured for calculating the time point corresponding to the leading edge by using the digital data based on the threshold value and by using the comparison signal, and for performing the range measurement calculation,
wherein the acquiring the time point corresponding to the leading edge comprises:
estimating a sampling moment of a datum of the digital data having value '1' immediately after a datum of the digital data having value '0' as an initial time point corresponding to the leading edge;
generating sub-sampled data by performing sub-sampling according to a second sampling period shorter than the first sampling period on the comparison signal between the sampled moment of the datum having value '1' and a sampled moment of the datum having value '0'; and
determining a final time point corresponding to the leading edge as the time point corresponding to the leading edge based on the sub-sampled data.

* * * * *